Patented Aug. 5, 1952 2,606,157

UNITED STATES PATENT OFFICE 2,606,157

REMOVING CALCIUM SULFATE SCALE

Paul H. Cardwell and Billy P. Robinson, Tulsa, Okla., assignors to The Dow Chemical Company, Midland, Mich., a corporation of Delaware No Drawing. Application September 6, 1949, Serial No. 114,290

4 Claims. (Cl. 252—175)

The invention relates to a method of removing calcium sulfate scale deposits from heat exchange surfaces.

One of the most common kinds of scale which deposits upon heat exchange surfaces involved in heating and boiling many natural waters is calcium sulfate or anhydrite in various states of purity. Its presence is usually detrimental to the efficiency of the apparatus on which it deposits in use and much time, labor, and inconvenience are involved in its removal by conventional methods which are generally limited to mechanically dislodging the deposits. Insofar as we are aware, no satisfactory methods are commercially available by which calcium sulfate scale can be dislodged without the expenditure of an inordinate amount of time and labor.

We have discovered that by subjecting the calcium sulfate scale to the dissolving action of a hot aqueous solution of certain water-soluble chromium compounds, the scale is readily dissolved and dislodged so that a clean surface is obtained with substantial savings in time and labor.

The water-soluble chromium compounds whose aqueous solutions we have found dissolve calcium sulfate scales are the following: Chromic acid ($CrO_3$ dissolved in water), the alkali metal and ammonium chromates and dichromates, chromic bromide, chromic chloride, and chromic nitrate.

These water soluble chromium compounds are used in a concentration in excess of 0.05 molar up to saturation but the concentration need not exceed 9 molar in the case of chromic chloride, bromide or nitrate or 6.5 molar for the other chromium compounds. The rate of action is increased as the temperature of the solution is increased. A generally suitable operating temperature is 150° F. although it is preferable to employ the solution at its atmospheric boiling point.

The length of time the solution may be allowed to act upon the scale depends upon the thickness of the scale and operating temperature. Substantial amounts of scale dissolve even in a few minutes time, however, it is preferable to maintain the solution in contact with the scale for at least 3 to 6 hours at a temperature of at least 180° F.

The following tabulated examples are illustrative of the dissolving action of the solutions on calcium sulfate scale (anhydrite), the solution being held for 3 hours at the boiling temperature in contact with a large amount of anhydrite. The data show the weight of anhydrite dissolved by a given weight of chromium compound under the specified conditions.

Table I

| Scale Solvent | | $CaSO_4$ Dissolved Per 100 Grams of Solvent |
|---|---|---|
| Water-Soluble Chromium Compound | Moles of Compound Per 100 Grams Solvent | |
| $CrO_3$ | 0.05 | 0.0108 |
| $(NH_4)_2CrO_4$ | 0.049 | 0.00465 |
| $K_2CrO_4$ | 0.05 | 0.00449 |
| $Na_2CrO_4$ | 0.05 | 0.00493 |
| $K_2Cr_2O_7$ | 0.025 | 0.00386 |
| $Na_2Cr_2O_7$ | 0.025 | 0.00401 |
| $(NH_4)_2Cr_2O_7$ | 0.025 | 0.00402 |

Similar tests were made on an impure anhydrite scale containing 50 per cent by weight of calcium sulfate, 15 per cent of alpha quartz, the remainder unidentified siliceous material, with the following results tabulated in Table II.

Table II

| Aqueous Solution Used | Grams of $CaSO_4$ Dissolved per 100 Grams Solvent |
|---|---|
| 5% chromic chloride | 1.540 |
| 10% chromic nitrate | 2.637 |
| 15% chromic bromide | 2.704 |

In the tests of Table II, the chromium compound was dissolved in water in the concentration by weight indicated and the solution was maintained at 210° F. in contact with the scale for 3 hours. After acting upon the scale, the spent solvent was separated from the undissolved portion of the scale and analyzed for its calcium sulfate content which is set forth in the last column of the table.

EXAMPLE 1

A boiler has a liquid capacity of 2000 gallons and has deposited on the steam generating surfaces 250 pounds of anhydrite. 830 pounds of chromic acid are dissolved in enough water to make 2000 gallons of solution (about 5 per cent concentration) which is introduced into the boiler and heated therein to boiling. The solution is kept boiling for about 6 hours then drained and flushed. The scale is removed.

EXAMPLE 2

A heat exchanger has a liquid capacity of 246 gallons and the heat exchange surface has deposited thereon 12 pounds of calcium sulfate scale. As seen in Table I, 100 grams of a 0.025 molar solution of sodium dichromate ($Na_2Cr_2O_7$) dissolves 0.004 mole of calcium sulfate. Using this data, it is calculated that 164 pounds of sodium dichromate dissolved in water sufficient to fill the heat exchanger are used. The solution is heated to boiling and introduced into the heat exchanger and kept hot in the exchanger for 3 hours. The resulting spent solution is drained out and the exchanger flushed with water. The exchanger thus freed of scale is ready for use.

We claim:

1. In a method of removing calcium sulfate scale deposited upon a heat exchange surface, the steps which consist in subjecting the deposit to the dissolving action of an aqueous solution of a water-soluble chromium compound selected from the group consisting of chromic acid, alkali metal and ammonium chromates and dichromates, chromic chloride, chromic bromide, and chromic nitrate, said compound being present in the solution in a concentration of at least 0.025 mole per 100 grams of the solution, and the solution being heated to a temperature between about 150° F. and its atmosphere boiling point.

2. In a method according to claim 1 in which the water-soluble chromium compound is chromic acid.

3. In a method according to claim 1 in which the water-soluble chromium compound is sodium chromate.

4. In a method according to claim 1 in which the water-soluble chromium compound is chromic chloride.

PAUL H. CARDWELL.
BILLY P. ROBINSON.

REFERENCES CITED

The following references are of record in the file of this patent:

FOREIGN PATENTS

| Number | Country | Date |
|---|---|---|
| 331,725 | Great Britain | July 10, 1930 |
| 491,023 | Great Britain | Aug. 24, 1938 |